United States Patent [19]
Muramatsu et al.

[11] Patent Number: 5,215,293
[45] Date of Patent: Jun. 1, 1993

[54] FLUID-FILLED ELASTIC MOUNT HAVING DOUBLE-LAYERED FLEXIBLE MEMBRANE SEPARATING FLUID CHAMBER AND VACUUM-RECEIVING CHAMBER

[75] Inventors: Atsushi Muramatsu, Komaki; Yoshiki Funahashi, Iwakura; Akiyoshi Ide, Inuyama, all of Japan

[73] Assignee: Tokai Rubber Industries, Ltd., Japan

[21] Appl. No.: 832,588

[22] Filed: Feb. 7, 1992

[30] Foreign Application Priority Data

Feb. 14, 1991 [JP] Japan ............................. 3-012596[U]

[51] Int. Cl.⁵ .............................................. F16F 13/00
[52] U.S. Cl. .................................. 267/140.14; 267/35; 267/64.14; 267/122; 267/219
[58] Field of Search ................. 267/140.1 R, 140.1 A, 267/140.1 AE, 219, 220, 35, 140.1 E, 140.1 C, 64.14, 218, 122, 140.11-140.15, 140.3; 248/636, 562, 638, 550; 180/300, 312, 902

[56] References Cited

U.S. PATENT DOCUMENTS

| | | | |
|---|---|---|---|
| 3,874,646 | 4/1975 | Vernier | 267/140.1 A |
| 4,650,169 | 3/1987 | Eberhard et al. | 267/64.14 X |
| 4,651,980 | 3/1987 | Morita et al. | 267/140.1 A |
| 4,657,232 | 4/1987 | West | 267/35 X |
| 4,709,907 | 12/1987 | Thorn | 267/140.1 A |
| 4,721,288 | 1/1988 | Andra et al. | 267/140.1 A |
| 4,781,361 | 11/1988 | Makibayashi et al. | 267/219 X |
| 4,781,362 | 11/1988 | Reuter et al. | 267/219 |
| 4,889,325 | 12/1989 | Flower et al. | 267/140.1 A |
| 4,903,950 | 2/1990 | Gregoire | 267/140.1 A |
| 4,907,786 | 3/1990 | Okazaki et al. | 267/219 |
| 4,925,162 | 5/1990 | Kojima | 267/140.1 A |
| 4,981,286 | 1/1991 | Kato et al. | 267/140.1 AE |
| 5,040,774 | 8/1991 | Veverka et al. | 267/140.1 C |
| 5,098,072 | 3/1992 | Muramatsu et al. | 267/140.1 C |
| 5,145,156 | 9/1992 | Muramatsu et al. | 267/35 |

FOREIGN PATENT DOCUMENTS

| | | | |
|---|---|---|---|
| 57-9340 | 1/1982 | Japan . | |
| 57-200742 | 12/1982 | Japan | 267/140.1 A |
| 61-59035 | 3/1986 | Japan . | |
| 61-119834 | 6/1986 | Japan . | |
| 61-153035 | 7/1986 | Japan . | |
| 63-172035 | 7/1988 | Japan . | |
| 2165617 | 4/1986 | United Kingdom | 267/140.1 A |

*Primary Examiner*—Douglas C. Butler
*Attorney, Agent, or Firm*—Parkhurst, Wendel & Rossi

[57] ABSTRACT

A fluid-filled elastic mount including mutually spaced-apart first and second support members, and an elastic body for elastically connecting the first and second support members. The elastic mount has a plurality of fluid chambers filled with a non-compressible fluid and communicating with each other through an orifice passage or passages, and an air-tight operating chamber which is formed on one side of a flexible membrane remote from the corresponding fluid chamber. This flexible membrane consists of a fluid-impermeable first flexible layer which is corrosion-resistant to the non-compressible fluid, and a fluid-impermeable second flexible layer which is corrosion-resistant to gasoline. These flexible layers are superposed on each other such that the first flexible layer is exposed to the fluid chamber while the second flexible layer is exposed to the operating chamber. The elastic mount further includes a pressure control device for applying a vacuum pressure to the operating chamber so as to restrict elastic deformation of the flexible membrane.

11 Claims, 2 Drawing Sheets

FLUID-FILLED ELASTIC MOUNT HAVING DOUBLE-LAYERED FLEXIBLE MEMBRANE SEPARATING FLUID CHAMBER AND VACUUM-RECEIVING CHAMBER

BACKGROUND OF THE INVENTION

1. Field of the Invention

The present invention relates in general to a fluid-filled elastic mount, which utilizes a vacuum pressure for exhibiting different vibration damping and isolating characteristics based on the flow of a non-compressible fluid contained therein, depending upon the type of vibrations applied thereto. More particularly, the present invention is concerned with an improvement over the fluid-filled elastic mount, which efficiently utilizes as the vacuum pressure an intake pressure in an intake or suction system of an internal combustion engine of a motor vehicle while assuring a sufficiently high degree of durability of the mount.

2. Discussion of the Prior Art

An elastic mount, such as an engine mount or suspension bushing for a motor vehicle, is known as a vibration damping device interposed between two members of a vibration system, for flexibly connecting these two members. As a type of this elastic mount, there is known a so-called fluid-filled elastic mount as disclosed in JP-A-57-9340 and JP-A-63-172035. The elastic mount disclosed in these publications includes a first and a second support structure which are spaced apart from each other and are elastically connected to each other by an elastic body interposed therebetween. The elastic mount has a plurality of fluid chambers formed therein, which are filled with a suitable non-compressible fluid and are held in fluid communication with each other through an orifice passage or passages. Upon application of vibrations, the elastic mount of this type provides an intended vibration damping effect based on flow of the non-compressible fluid through the orifice passage.

However, the fluid-filled elastic mount of the above type provides a sufficiently high damping effect based on the fluid flow through the orifice passage, only with respect to input vibrations in a limited frequency range around the resonance frequency of the fluid in the orifice passage. Therefore, the above elastic mount is not suitably used as an engine mount or suspension bushing for a vehicle which is required to exhibit excellent vibration damping characteristics for a wider frequency range of vibrations.

In view of the above situations, it has been recently proposed to provide a fluid-filled elastic mount of a vacuum control type, as disclosed in JP-A-61-59035, JP-A-61-119834 and JP-A-61-153035. The elastic mount disclosed in the publications includes a flexible rubber membrane partially defining at least one of the fluid chambers, and has an air-tight operating chamber formed on one side of the flexible rubber membrane remote from the fluid chamber. In operation, the operating chamber is selectively subjected to a vacuum pressure so as to control elastic deformation of the rubber membrane, so that the elastic mount exhibits different vibration damping or isolating characteristics depending upon the type of the vibrations applied thereto. In particular, this elastic mount is advantageously employed in a mounting system including an internal combustion engine of a motor vehicle, for example, since the elastic mount can readily utilize an intake pressure in an intake pipe of the engine, as the vacuum pressure to be applied to the operating chamber.

However, the inventors' study on the known elastic mount described just above revealed that a combustion gas (air-fuel mixture) containing gasoline or its vapor, which flows from an engine combustion chamber back into the intake pipe, undesirably flows into the operating chamber of the mount where the operating chamber is held in direct communication with the intake pipe. Consequently, the flexible rubber membrane bounding the operating chamber is likely to be affected by the pre-combustion gas flow from the engine, resulting in considerably lowered durability of the mount.

In the meantime, the engine mount, which is used at greatly varying ambient temperatures, favorably employs as the non-compressible fluid filling the fluid chambers, alkylene glycol and the like which exhibit relatively low viscosity over a wide temperature range. However, a rubber material conventionally used for the flexible membrane of the engine mount, for example, does not have sufficiently high degrees of resistance to both the fluid in the fluid chambers and gasoline in the pre-combustion gas flowing into the operating chamber. Therefore, it has been difficult to assure a sufficiently high degree of durability of the fluid-filled elastic mount of the above-described vacuum control type.

SUMMARY OF THE INVENTION

It is therefore an object of the present invention to provide an improved fluid-filled elastic mount which is capable of efficiently utilizing an intake pressure in an intake system of an internal combustion engine as a vacuum pressure for controlling a vibration damping or isolating characteristic of the mount, while assuring a sufficiently high degree of durability of the mount.

The above object may be achieved according to the principle of the present invention, which provides a fluid-filled elastic mount for flexibly connecting two members, comprising: (a) a first support member and a second support member which are spaced apart from each other and respectively fixed to the two members to be flexibly connected; (b) an elastic body interposed between the first and second support members for elastically connecting the first and second support members; (c) means for defining a plurality of fluid chambers filled with a non-compressible fluid and communicating with each other through at least one orifice passage; (d) a flexible membrane partially defining a corresponding one of at least one of the plurality of fluid chambers; (e) means for forming an air-tight operating chamber on one of opposite sides of the flexible membrane remote from the corresponding one fluid chamber; (f) the flexible membrane comprising a fluid-impermeable first flexible layer which is corrosion-resistant to the non-compressible fluid, and a fluid-impermeable second flexible layer which is corrosion-resistant to gasoline, the first and second flexible layers being superposed on each other such that the first flexible layer is exposed to the corresponding one fluid chamber while the second flexible layer is exposed to the operating chamber; and (g) pressure control means for applying a vacuum pressure to the operating chamber so as to restrict elastic deformation of the flexible membrane.

In the fluid-filled elastic mount constructed as described above according to the present invention, the first and second fluid-impermeable flexible layers of the flexible membrane are formed of respective materials of different corrosion resistance properties. Since the first flexible layer is not exposed to a combustion gas flowing from an intake pipe of an internal combustion engine of a vehicle, and the second flexible layer is not exposed to the non-compressible fluid contained in the mount, the first flexible layer need not be resistant to corrosion due to gasoline contained in the combustion gas, and the second flexible layer need not be resistant to corrosion due to the non-compressible fluid in the mount.

Namely, the first flexible layer is made of a material which is highly corrosion-resistant to the fluid contained in the mount, while the second flexible layer is made of a material which is highly corrosion-resistant to gasoline. In this arrangement, the present fluid-filled elastic mount exhibits a high degree of durability even if the elastic mount utilizes an intake pressure in an intake system of the internal combustion system as the vacuum pressure to be applied to the operating chamber.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
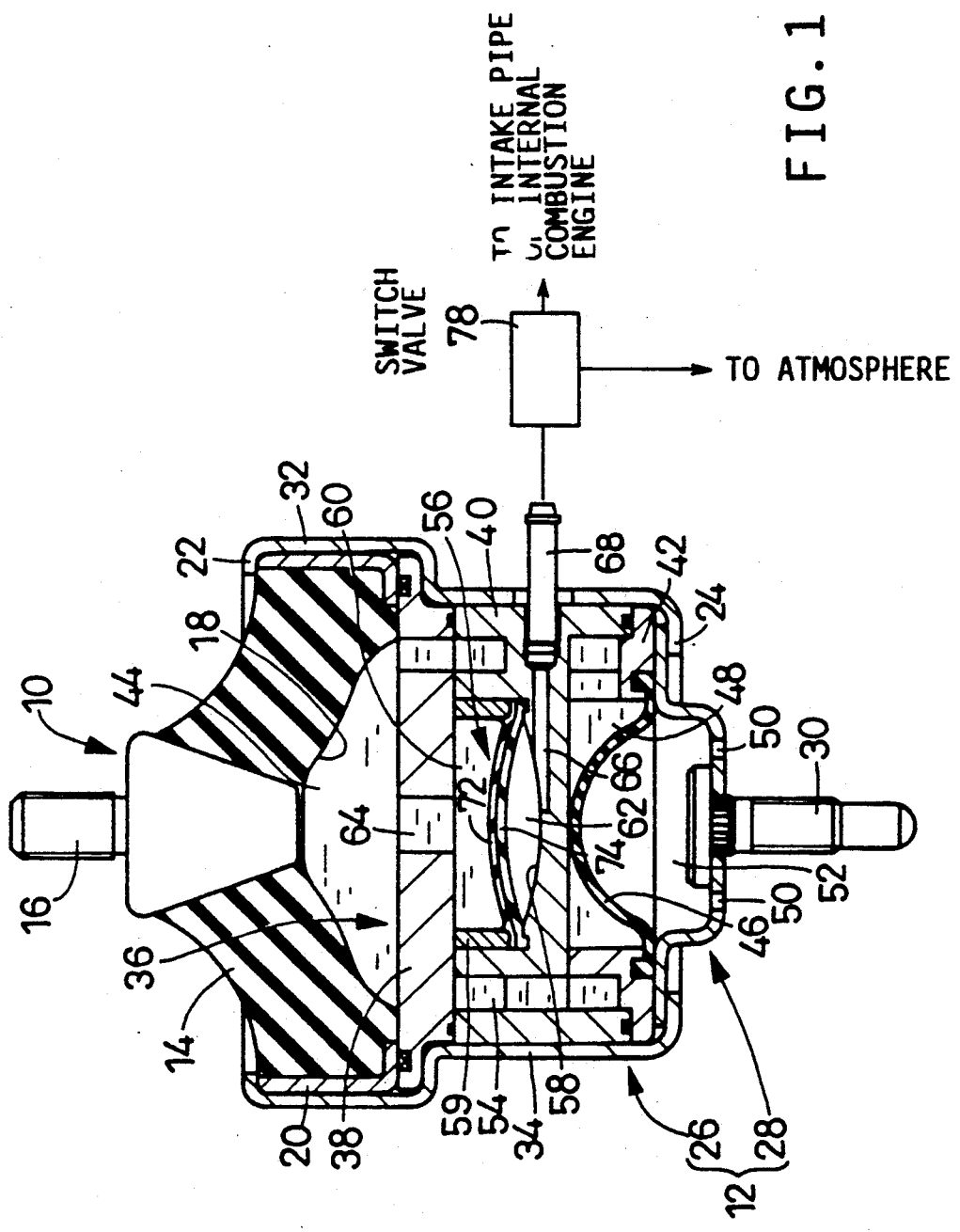
FIG. 1 is an elevational view in axial cross section of one embodiment of a fluid-filled elastic mount of the present invention in the form of an engine mount for a motor vehicle.

Referring first to FIG. 1 showing the vehicle engine mount as one embodiment of the fluid-filled elastic mount of this invention, reference numerals 10 and 12 denote a first and a second rigid support member, respectively. These first and second support members 10, 12 are opposed to each other and spaced apart from each other by a suitable distance, in a load-receiving direction in which vibrations are received by the engine mount. Between the first and second support members 10, 12, there is formed an elastic body 14 such that the two members 10, 12 are elastically connected to each other by the elastic body 14. The instant engine mount is installed on a motor vehicle such that the first support member 10 is fixed to an engine unit including an internal combustion engine of the vehicle, while the second support member 12 is fixed to a body of the vehicle. Thus, the engine unit is flexibly mounted on the vehicle body in a vibration damping or isolating manner. With the engine mount installed in position on the vehicle as described above, the weight of the engine unit acts on the mount in the direction in which the first and second support members 10, 12 are opposed to each other, whereby the elastic body 14 is elastically deformed or contracted so that the two support members 10, 12 are moved toward each other from their pre-installation positions by a suitable distance in the above-indicated direction. The instant engine mount is adapted to damp or isolate the input vibrations which are applied primarily in the direction (vertical direction as viewed in FIG. 1) in which the first and second support members 10, 12 are opposed to each other, that is, the above-indicated load-receiving direction.

More specifically, the first support member 10 is a metallic member having a generally truncated conical shape. A mounting bolt 16 is formed integrally with the first support member 10 such that the bolt 16 protrudes in the load-receiving direction from a central portion of the large-diameter end face of the support member 10, axially outwardly of the engine mount. The engine mount is fixed to the vehicle engine unit through the mounting bolt 16.

The above-indicated elastic body 14 is secured by vulcanization to the first support member 10. This elastic body 14 has a generally truncated conical shape, and is formed with a cavity 18 which is open in its large-diameter end face on the side of the second support member 12. The first support member 10 is bonded by vulcanization to the small-diameter end face of the elastic body 14, while a cylindrical connecting member 20 made of metal is bonded by vulcanization to the outer circumferential surface of a large-diameter end portion of the elastic body 14. Thus, the first support member 10, elastic body 14 and connecting member 20 are formed into an integral unit, by means of vulcanization of a suitable rubber material for the elastic body 14.

The second support member 12 consists of a generally cylindrical member 26 with an axially intermediate stepped portion, and a dish-like bottom member 28 fixed to the cylindrical member 26 to close one opening of the member 26 at its small-diameter axial end. The cylindrical member 26 includes a large-diameter portion 32, a small-diameter potion 34 and the stepped portion disposed therebetween. The cylindrical member 26 further includes caulked portions 22, 24 formed at its axially opposite end portions, and is fixed at the caulked portion 24 to an outer peripheral portion of the bottom member 28. Thus, the second support member 12 as a whole is a generally cup-shaped structure having a relatively large depth. A mounting bolt 30 is formed on the second support member 12 so as to protrude in the load-receiving direction from a central portion of the bottom member 28, axially outwardly of the engine mount. The engine mount is fixed to the vehicle body through the mounting bolt 30.

The above-indicated connecting member 20 secured to the outer surface of the elastic body 14 is fitted in the large-diameter portion 32 of the cylindrical member 26 of the second support member 12. In this manner, the second support member 12 is assembled with the integral unit of the first support member 10, elastic body 14 and connecting member 20. Thus, the first and second support members 10, 12 are opposed to each other in the load-receiving direction (vertical direction as viewed in FIG. 1) with a suitable spacing therebetween, with the elastic body 14 interposed between these two support members 10, 12 for flexible connection therebetween.

Within the small-diameter portion 34 of the cylindrical member 26 of the second support member 12, there is accommodated a thick-walled, generally circular partition structure 36 which extends in a direction substantially perpendicular to the load-receiving direction. The partition structure 36 consists of an upper and a middle partition member 38, 40 having a generally disc-like shape, and a generally annular lower partition member 42. These three partition members 38, 40, 42 are coaxially superposed on each other in the axial direction of the engine mount, and are fixedly attached to the second support member 12. Between the mating surfaces of the partition members 38, 40 and 42 and between the abutting faces of the upper partition member 38 and the connecting member 20, there are provided suitable 0 rings for ensuring fluid-tightness between these members 38, 40, 42 and 20.

Between the partition structure 36 and the first support member 10, there is formed a pressure-receiving fluid chamber 44 which is partially defined by the elastic body 14. The pressure-receiving chamber 44 is filled with a suitable non-compressible fluid, such as alkylene glycol or polyalkylene glycol, whose viscosity is relatively low over a wide range of the operating temperature. When a vibrational load is applied between the first and second support members 10, 12, a pressure of the fluid in the pressure-receiving chamber 44 changes as a result of a volume change of the chamber 34 due to elastic deformation of the elastic body 14.

Between the partition structure 36 and the bottom member 28 of the second support member 12, on the other hand, there is formed an enclosed space remote from the pressure-receiving chamber 44. A flexible diaphragm 46 is accommodated in the enclosed space such that the diaphragm 46 is fluid-tightly gripped at its perimeter by and between the partition structure 36 (lower partition member 42) and the bottom member 28. The flexible diaphragm 46 is adapted to divide the space between the partition structure 36 and the bottom member 28, into two sections, i.e., a first variable-volume equilibrium chamber 48 and a first air chamber 52. The first equilibrium chamber 48, which is formed between the partition structure 36 and the flexible diaphragm 46, is filled with the non-compressible fluid as described above. The equilibrium chamber 48 will not undergo a pressure change upon application of vibrations to the engine mount, since the pressure change is absorbed by a volume change of the chamber 48 due to elastic deformation or displacement of the diaphragm 46. The first air chamber 52, which is formed between the diaphragm 46 and the bottom member 28, communicates with the atmosphere through holes 50 formed through the bottom member 28, and is adapted to allow the elastic deformation of the diaphragm 46.

The partition structure 36 has a first orifice passage 54 formed in the circumferential direction through radially outer portions of the upper, middle and lower partition members 38, 40, 42, over a given circumferential length (which is longer than one round and shorter than two rounds in this embodiment). The pressure-receiving chamber 44 and the first equilibrium chamber 48 are held in fluid communication with each other, through the first orifice passage which permits flow of the fluid therethrough between the two fluid chambers 44, 48.

The middle partition member 40 has a recess 58 whose opening is closed by the upper partition member 38, whereby the partition structure 36 is formed with an internal space which is substantially separated from the pressure-receiving chamber 44 and the first equilibrium chamber 48. Within the space formed in the partition structure 36, there is accommodated a flexible rubber membrane 56 such that its peripheral portion is fluid-tightly gripped between the upper and middle partition members 38, 40 through a retainer ring 59. This flexible membrane 56 divides the space between these partition members 38, 40, into two sections. More specifically, between the upper partition member 38 and the flexible membrane 56 is formed a second equilibrium chamber 60 which is filled with the non-compressible fluid as described above. The second equilibrium chamber 60 will not undergo a pressure change upon application of vibrations to the engine mount, since the pressure change is absorbed by a volume change of the chamber 60 due to elastic deformation of the flexible membrane 56. Between the flexible membrane 56 and the middle partition member 40, there is formed an air-tight operating chamber 62 which allows the elastic deformation of the flexible membrane 56. Since the flexible rubber membrane 56 keeps its normal shape due to its own elasticity, while being convexed toward the upper partition member 38, the operating chamber 62 having a predetermined volume appears as shown in FIG. 1 in the normal operating condition of the mount (i.e., when the operating chamber 60 is exposed to the atmosphere as described later).

The upper partition member 38 has a second orifice passage 64 formed at its central portion through the entire thickness thereof in the axial direction of the mount. The second equilibrium chamber 60 communicates with the pressure-receiving chamber 44, through the second orifice passage 64 which permits flow of the fluid therethrough between the two chambers 44, 60. As is apparent from FIG. 1, the second orifice passage 64 has a larger cross sectional area and a smaller flow length than the first orifice passage 54. That is, the ratio of the cross sectional area to the length of the second orifice passage 64 is larger than that of the first orifice passage 54. Accordingly, the resonance frequency of the fluid flowing through the second orifice passage 64 is set to be higher than that of the fluid flowing through the first orifice passage 54.

In the instant embodiment, the first orifice passage 54 is tuned so that the engine mount is able to effectively damp relatively low-frequency vibrations, such as engine shake or bounce, based on resonance of a mass of the fluid in the passage 54. On the other hand, the second orifice passage 64 is tuned so that the engine mount exhibits a sufficiently reduced dynamic spring constant with respect to relatively high-frequency vibrations, such as engine idling vibrations, based on the resonance of a mass of the fluid in the passage 64.

The above-indicated operating chamber 62 is exposed to the exterior space, through an air passage 66 formed through the middle partition member 40, and a connector 68 which is screwed into an open end portion of the air passage 66. With the engine mount installed in position on the motor vehicle, the operating chamber 62 is connected to an intake pipe of the internal combustion engine (not shown) of the motor vehicle, through the air passage 66, connector 68, and a switch valve 78. The switch valve 78 is selectively placed in a first position for exposing the operating chamber 62 to the atmosphere, and a second position for connecting the operating chamber 62 to the intake pipe of the engine, so that a selected one of an atmospheric pressure and an intake (vacuum) pressure of the engine is applied to the operating chamber 62.

The above-indicated flexible rubber membrane 56 for partitioning the second equilibrium chamber 60 and the operating chamber 62 has a double-layered structure, i.e., consists of thin-walled disc-like first and second rubber layers 72, 74 formed of different rubber materials. These first and second rubber layers 72, 74 are superposed on each other over the entire surface areas thereof, such that the first rubber layer 72 is disposed on the side of the second equilibrium chamber 60 while the second rubber layer 74 is disposed on the side of the operating chamber 62. Namely, the first rubber layer 72 is exposed to the non-compressible fluid filling the second equilibrium chamber 60 but is not in contact with the gas present in the operating chamber 62, while the second rubber layer 74 is exposed to the gas in the operating chamber 62 but is not in contact with the fluid in the second equilibrium chamber 60.

The first rubber layer 72 of the flexible membrane 56 is made of a rubber material which exhibits high corrosion resistance to the non-compressible fluid filling the mount, while the second rubber layer 74 is made of a rubber material which exhibits high corrosion resistance to gasoline contained in a combustion gas (air-fuel mixture) of the internal combustion engine. It is to be understood that the first and second rubber layers 72, 74 are not necessarily secured to each other at their mating surfaces but may be merely superposed on each other. Further, even a small clearance may exist between the mating surfaces of these rubber layers 72, 74 as long as the clearance does not seriously affect the concurrent elastic deformation or displacement of the rubber layers 72, 74.

In the thus constructed engine mount as installed in place on the vehicle, upon application of vibrations between the first and second support members 10, 12, the non-compressible fluid is forced to flow between the pressure-receiving chamber 44 and the first and second equilibrium chambers 48, 60, through the first and second orifice passages 54, 64, based on a pressure difference between the pressure-receiving chamber 44 and the two equilibrium chambers 48, 60. In the instant embodiment, the fluid is forced to flow through either the second orifice passage 64 or the first orifice passage 54, by placing the switch valve 78 selectively in the first position in which the operating chamber 62 is exposed to the atmosphere, and the second position in which the operating chamber 62 is subjected to the vacuum pressure supplied from the intake pipe of the engine. Thus, the instant engine mount exhibits desired vibration damping or isolating characteristics, depending upon the type of the vibrations applied thereto, based on the resonance of the fluid mass in the first or second orifice passage 54, 64.

Figure 2:
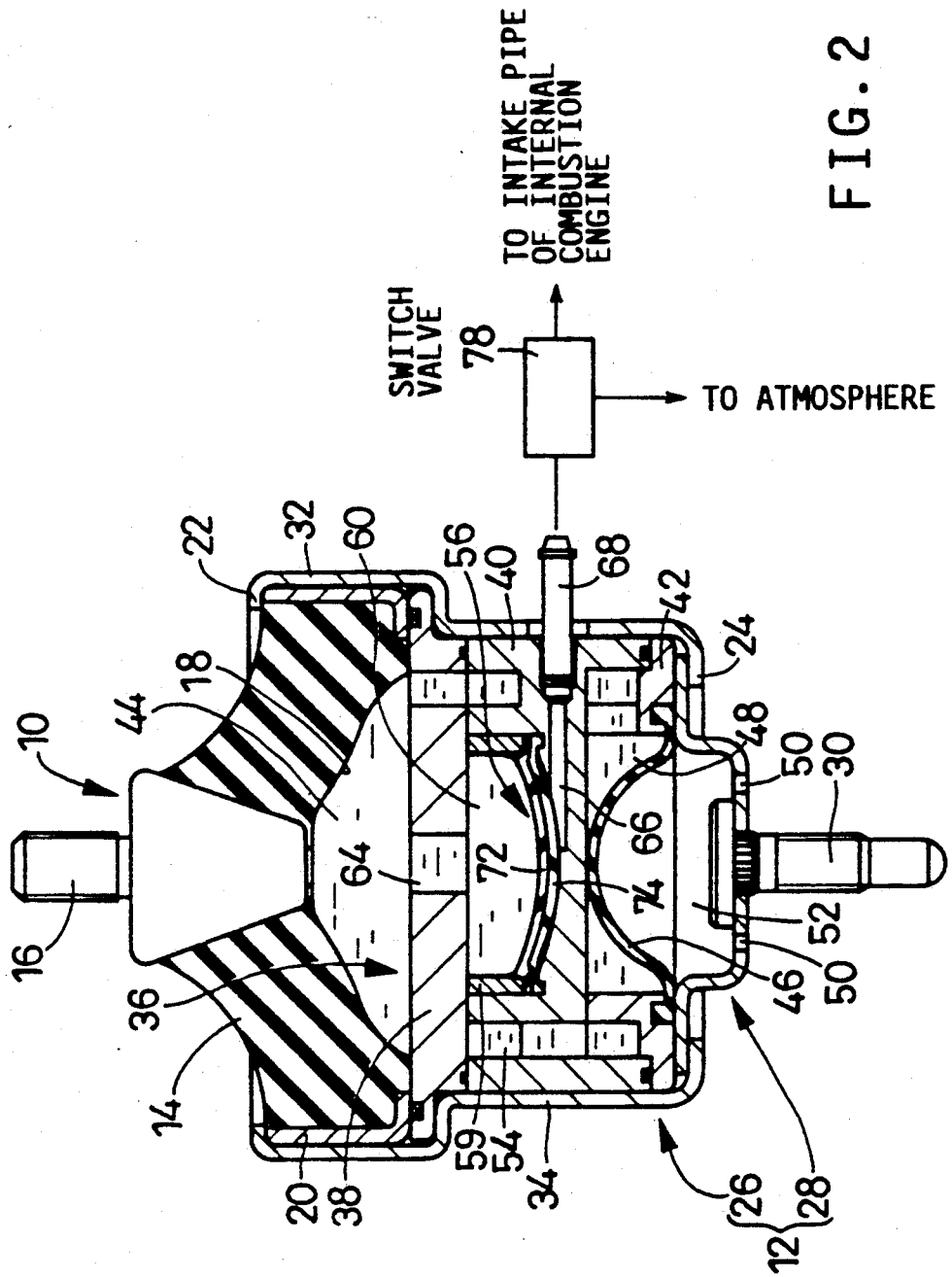
FIG. 2 is an axial cross sectional view showing the engine mount of FIG. 1 when an operating chamber of the mount is subjected to a vacuum pressure from the engine.

More specifically described, when the engine mount receives low-frequency vibrations such as engine shake or bounce, which should be damped by fluid flow through the first orifice passage 54, the switch valve 78 is operated to the second position for connecting the operating chamber 62 to the intake pipe of the internal combustion engine. As a result, the operating chamber 62 is subjected to the vacuum pressure in the intake pipe, whereby the flexible membrane 56 is drawn onto the bottom wall of the recess 58, and the volume of the operating chamber 62 is substantially zeroed, as shown in FIG. 2. In this condition, the elastic deformation of the the flexible membrane 56 is restricted, namely, the membrane 56 is prevented from being freely deformed to accommodate a volume change of the second equilibrium chamber 60 so as to absorb a pressure change in the same chamber 60. Consequently, the fluid is forced to flow between the pressure-receiving chamber 44 and the first equilibrium chamber 48 through the first orifice passage 54, based on pressure changes arising in the pressure-receiving chamber 44. Thus, the engine mount is able to effectively damp the low-frequency vibrations, based on the resonance of the fluid flowing through the first orifice passage 54.

On the other hand, when the engine mount receives high-frequency vibrations such as engine idling vibrations, which should be isolated by the fluid flow through the second orifice passage 64, the switch valve 78 is operated to the first position for exposing the operating chamber 62 to the atmosphere. As a result, the operating chamber 62 having the predetermined volume appears as shown in FIG. 1, and is adapted to allow the elastic deformation of the flexible membrane 56 to thereby permit a volume change of the second equilibrium chamber 60. Consequently, effective flows of the fluid occur between the pressure-receiving chamber 44 and second equilibrium chamber 60 through the second orifice passage 64, based on pressure changes arising in the pressure-receiving chamber 44. Thus, the engine mount provides a sufficiently reduced dynamic spring constant for isolating the high-frequency vibrations, based on the resonance of the fluid flowing through the second orifice passage 64. In this condition, the first orifice passage 54 is held in fluid communication with the pressure-receiving and first equilibrium chambers 44, 48. However, the fluid is less likely to flow between these chambers 44, 48, due to relatively large resistance to the fluid flow through the first orifice passage 54 whose ratio of the cross sectional area to the length is smaller than that of the second orifice passage 64. In substance, the high-frequency vibrations cause the fluid to effectively flow only through the second orifice passage 64, between the pressure-receiving and second equilibrium chamber 44, 60.

In the instant engine mount as described above, the flexible rubber membrane 56 for partitioning the second equilibrium chamber 60 and the operating chamber 62 is double-layered, i.e., consists of the first and second rubber layers 72, 74. Therefore, the first rubber layer 72 which is in contact with the non-compressible fluid contained in the mount is completely prevented from contacting the pre-combustion gas flowing into the operating chamber 62, while the second rubber layer 74 which is in contact with the pre-combustion gas is completely prevented from contacting the non-compressible fluid.

It follows from the above description that it is not necessary to take account of the corrosion of the first rubber layer 72 due to gasoline present in the combustion gas, and the corrosion of the second rubber layer 74 due to the non-compressible fluid contained in the elastic mount. Accordingly, the rubber material for the first rubber layer 72 is selected from those having high corrosion resistance to the fluid in the mount, including IIR (butyl rubber) which is highly corrosion-resistant to ethylene glycol, while the rubber material for the second rubber layer is selected from those having high corrosion resistance to gasoline, oil and other substances contained in the combustion gas, including NBR (nitrile rubber) and CHC (epichlorohydrine rubber). The thus selected materials for the first and second rubber layers 72, 74 will assure significantly improved durability of the elastic mount.

While the present invention has been described in its presently preferred embodiment with a certain degree of particularity, for illustrative purpose only, it is to be understood that the invention is not limited to the details of the illustrated embodiments, but may be embodied otherwise.

For example, the materials for the first and second flexible layers of the flexible membrane partitioning the fluid chamber and the operating chamber are not limited to those of the illustrated embodiment, but may be suitably selected from other rubber materials, or resinous materials, which have high corrosion resistance to the non-compressible fluid in the mount or gasoline in the combustion gas, and sufficient fluid-impermeability to the fluid or the gas.

Further, the construction of the fluid-filled elastic mount to which the present invention is applicable is never limited to that of the illustrated embodiment. For instance, the number and form of the fluid chambers or the number and form of the orifice passages may be suitably changed depending upon the required vibration damping or isolating characteristics of the mount, for example. The principle of the present invention is also favorably applicable to various known mounting devices which exhibit different vibration damping/isolating characteristics depending upon the type of input vibrations, by selectively applying a vacuum pressure to an operating chamber which is separated from a fluid chamber by a flexible membrane, as disclosed in JP-A-61-59035, JP-A-61-153035 and JP-A-61-119834.

The principle of the present invention is also equally applicable to a fluid-filled cylindrical elastic mount as disclosed in JP-A-63-172035. Such an elastic mount is also able to change its vibration damping characteristics in response to input vibrations, by applying a vacuum pressure to an operating chamber formed behind a fluid chamber with a flexible membrane disposed therebetween.

It is to be understood that the present invention may be embodied with various other changes, modifications and improvements, which may occur to those skilled in the art, without departing from the scope of the invention defined in the following claims.

What is claimed is:

1. A fluid-filled elastic mount for flexibly connecting two members, comprising:
   a first support member and a second support member which are spaced apart from each other and respectively fixed to the two members to be flexibly connected;
   an elastic body interposed between said first and second support members for elastically connecting the first and second support members;
   means for defining a plurality of fluid chambers filled with a non-compressible fluid and communicating with each other through at least one orifice passage;
   a flexible membrane partially defining a corresponding one of at least one of said plurality of fluid chambers;
   means for forming an air-tight operating chamber on one of opposite sides of said flexible membrane remote from said corresponding one fluid chamber;
   said flexible membrane comprising a fluid-impermeable first flexible layer which is made of a first material corrosion-resistant to said non-compressible fluid, and a fluid-impermeable second flexible layer which is made of a second material corrosion-resistant to gasoline, said first material being different from said second material, said first and second flexible layers being superposed on and held in direct contact with each other such that said first flexible layer is exposed to said corresponding one fluid chamber while said second flexible layer is exposed to said operating chamber; and
   pressure control means for applying a vacuum pressure to aid operating chamber so as to restrict elastic deformation of said flexible membrane.

2. A fluid-filled elastic mount according to claim 1, wherein said first and second flexible layers are made of respective rubber materials.

3. A fluid-filled elastic mount according to claim 2, wherein said first flexible layer is made of IIR (butyl rubber) and said second flexible layer is made of one of NBR (nitrile rubber) and CHC (epichlorohydrine rubber).

4. A fluid-filled elastic mount according to claim 1, wherein said first and second flexible layers are secured to each other.

5. A fluid-filled elastic mount according to claim 1, wherein said flexible membrane keeps a normal shape and is elastically deformable while said vacuum pressure is not applied to said operating chamber.

6. A fluid-filled elastic mount according to claim 1, wherein said pressure control means comprises switching means which is operable between a first position for exposing said operating chamber to atmosphere, and a second position for connecting said operating chamber to an intake pipe of an internal combustion engine of a motor vehicle so that said operating chamber is subjected to an intake pressure in said intake pipe as said vacuum pressure, said second flexible layer of said flexible membrane being exposed to a gas containing gasoline, which gas flows from said intake pipe into said operating chamber when said switching means is placed in said second position.

7. A fluid-filled elastic mount according to claim 1, wherein said plurality of fluid chambers comprise a pressure-receiving chamber at least partially defined by said elastic body, a first equilibrium chamber partially defined by a flexible diaphragm, and a second equilibrium chamber partially defined by said flexible membrane, a pressure of said fluid in the pressure-receiving chamber changing due to elastic deformation of said elastic body upon application of vibrations, said flexible diaphragm and said flexible membrane being elastically deformable so as to permit volume changes of said first and second equilibrium chambers to absorb pressure changes of said fluid in the first and second equilibrium chambers, respectively.

8. A fluid-filled elastic mount according to claim 7, wherein said means for defining a plurality of fluid chambers comprises a partition structure supported by said second support member, said partition structure cooperating with said elastic body to at least partially define said pressure-receiving chamber and cooperating with said flexible diaphragm and said flexible membrane to define said first and second equilibrium chambers, respectively.

9. A fluid-filled elastic mount according to claim 8, wherein said at least one orifice passage comprises a first orifice passage communicating with said pressure-receiving chamber and said first equilibrium chamber, and a second orifice passage communicating with said pressure-receiving chamber and said second equilibrium chamber, said first and second orifice passages being defined by said partition structure.

10. A fluid-filled elastic mount according to claim 8, wherein said partition structure has an internal space which is divided by said flexible membrane into said second equilibrium chamber and said operating chamber.

11. A fluid-filled elastic mount according to claim 10, wherein said partition structure has an air passage communicating with said operating chamber, said operating chamber being connected to said pressure control means through said air passage.

* * * * *